United States Patent [19]

Brandt et al.

[11] Patent Number: 5,269,409
[45] Date of Patent: Dec. 14, 1993

[54] PACKAGE FOR AT LEAST ONE DISC PROVIDED WITH A CENTRAL CENTER HOLE

[75] Inventors: Rolf D. Brandt, Hanover; Hermann Grobecker, Garbsen; Werner Heuer, Lehrte, all of Fed. Rep. of Germany

[73] Assignee: U.S. Philips Corporation, New York, N.Y.

[21] Appl. No.: 590,388

[22] Filed: Sep. 28, 1990

[30] Foreign Application Priority Data

Sep. 28, 1989 [DE] Fed. Rep. of Germany ....... 3932425

[51] Int. Cl.$^5$ ............................................. B65D 85/30
[52] U.S. Cl. .................................... 206/309; 206/310; 206/311; 206/444
[58] Field of Search ................ 206/311, 312, 310, 444, 206/493, 309; 220/6, 23.2

[56] References Cited

U.S. PATENT DOCUMENTS

| | | | |
|---|---|---|---|
| 3,754,639 | 8/1973 | Gellert | 206/387 |
| 4,387,807 | 6/1983 | de la Rosa | 206/309 |
| 4,535,888 | 8/1985 | Nusselder | 206/444 |
| 4,702,369 | 10/1987 | Philosophe | 206/310 |
| 4,762,225 | 8/1988 | Henkel | 206/311 |
| 4,765,469 | 8/1988 | Seifert | 206/444 |
| 4,793,480 | 12/1988 | Gelardi et al. | 206/444 |
| 4,867,302 | 9/1989 | Takahashi | 206/32 |
| 4,874,085 | 10/1989 | Grobecker et al. | 206/310 |

FOREIGN PATENT DOCUMENTS 822305 10/1959 United Kingdom ............... 206/311

Primary Examiner—Steven N. Meyers
Assistant Examiner—M. D. Patterson
Attorney, Agent, or Firm—David R. Treacy

[57] ABSTRACT

A package having a plurality of rectangular component parts pivotably connected to one another about parallel swiveling axes. These parts include at least one disc carrier, having clamping elements for holding a disc to the carrier, as an intermediate part arranged between two covers. Swiveling axes for interconnecting the intermediate parts to each other and to the covers are situated alternately at opposite ends of the parts, so that the package opens into a zig-zag configuration. A cover may have an end portion arranged for positioning a thick textual insert having a spine, to allow text on the spine to be read through the end wall of the package. A single disc and a text insert over 3 mm thick can be stored in a package having principal dimensions the same as the standard individual CD package. For storing a plurality of discs, a disc carrier may have clamping elements on opposite sides of the carrier, preferably formed simultaneously with the carrier as one injection molding.

21 Claims, 10 Drawing Sheets

PACKAGE FOR AT LEAST ONE DISC PROVIDED WITH A CENTRAL CENTER HOLE

BACKGROUND OF THE INVENTION

1. Field of the Invention

The invention relates to a package for at least one disc provided with a central center hole, the package comprising a plurality of rectangular component parts connected to one another so as to be swivellable about parallel swivelling axes, said component parts including two covers arranged on mutually opposite outer sides, and an intermediate disc carrier part which is arranged between the said covers and carries clamping elements which serve to secure a disc in the region of the center hole.

2. Description of the Related Art

A package of the kind referred to above is known, for example, from U.S. Pat. 4,535,888.

FIG. 1 is a diagrammatic view of the known package for packaging digital, optically readable audio discs, the so-called standardized compact discs or CD's. Two to four CD's 3 having a center hole 1 can be packed in the package. The package comprises three parts connected to one another so as to be swivellable about parallel swivelling axes 5 and 7, said parts including two covers 9, provided at mutually opposite outer sides, and an intermediate part 11, which is provided between the said covers and acts as a disc carrier. The two covers 9 and the disc carrier 11 have clamping elements 15 and 13 respectively, which are assigned to clamping arrangements 19 and 17 respectively, each of which is provided with eight clamping elements. These are provided in a circle in such a way that they fit with slight clamping into the center hole 1 of the disc 3, in order to hold the disc clamped.

The known package illustrated, also referred to below as multiple package, is suitable for packaging two, three or four discs. The disc carrier 11 can namely be provided on only one side or on both sides with a clamping arrangement 17, as required. The covers 9 are always provided with clamping arrangements 19. The package is substantially made up of component parts which are in themselves also already used in the known package for accommodating just one CD. This older known package is illustrated in FIGS. 2 and 3, FIG. 2 being a diagrammatic view of the package with the cover opened and FIG. 3 being an exploded view.

The known package according to FIGS. 2 and 3, referred to below as individual package, comprises three plastic parts, namely a cover 21, a base 23 and a carrying element 25, provided in the base by means of a locking connection, for a disc 27 having a center hole 29. Again there are clamping elements 27 of a clamping arrangement 29 on the carrying element. The cover 21 and the base 23 are produced from a transparent plastic. A printed insert 31 can be accommodated in the cover and an insert 33 can be accommodated in the base. The two inserts are visible from outside through the transparent cover and determine the appearance of the package. The package can thereby be adapted to the information, e.g. music, recorded on the disc 27. Insert 31 is pushed under the knobs 35 and 37 of the cover. Insert 33 is pushed under the carrying element 25 and is thereby enclosed in the base 23.

The two covers 9 of the multiple package correspond to the base 23, with the carrying element 25 provided therein, of the individual package, so that it is possible in an economical manner to use standardized component parts for some of the parts needed for the multiple package. Added to this is the intermediate part acting as disc carrier 11, which can be provided on only one side or on both sides, as required, with a clamping arrangement 17 to be fitted individually. In this way, the multiple package is suitable for packaging two, three or four discs. In the case of the multiple package, too, inserts corresponding to insert 33 of the individual package are used, it thus also being possible to adapt the appearance of the multiple package as required to the music recorded on the CD's by the printing of the inserts used.

Because of the familiarity of the public with the packages illustrated in FIGS. 1 to 3, the description of further details has been omitted. The multiple package is used by the record companies in those cases in which the consumer is offered a quantity of related music with a playing time which exceeds that of a single CD. This is, for example, the case with long musical works, such as operas, or with so-called compilation discs and the like. Practical experience has shown, however, that, in approximately 70% of cases, only two CD's are offered simultaneously. Packaging of only two CD's in the known multiple package leads to the cost and the volume of the package being relatively high in relation to the cost and the volume of the discs offered. The multiple package comprises at least five component parts, being the two covers 9 with the carrying elements 39 provided therein and the disc carrier 11. In addition to these five plastics parts there are also the two inserts in the two covers 9. The number of component parts is thus relatively high. A consequence of the use of the package according to FIG. 1 is furthermore that the CD's packaged therein cannot be readily offered for sale in the sales stands customary in the trade since these have been designed for the much more common individual package.

SUMMARY OF THE INVENTION

It is the object of the invention to create a new package which is eminently suitable for accommodating two discs but is also suitable for one disc or for more discs or can at least be made suitable for this and, furthermore, offers a number of important additional advantages in comparison with the known prior art. For this purpose, the package according to the invention has the characterizing feature that the swivelling axes of the component parts arranged between the covers are situated alternately opposite one another, the package thus having a zigzag shape in the opened condition. The alternate arrangement of the swivelling axes of the covers gives rise to interesting new possibilities for the design of the package, for its dimensions and, depending on the area of application, a significant reduction in the number of component parts used or of the number of different types of component parts used. In particular, the vertical dimension of an intermediate part, acting as disc carrier, of a package according to the invention can be reduced by the fact that the two swivelling axes are no longer on the same side of the intermediate part. Thus, the vertical dimension of the known multiple package according to FIG. 1 could be reduced if the two covers 9 were not secured on the same side of the disc carrier 11.

Of interest in particular for the use of the packages according to the invention for accommodating up to two discs is an embodiment of the invention which has the characterizing feature that the two covers are designed without clamping elements. For this embodiment, the cover can have a smaller height and the cover is directly suitable, more or less like the cover 21 of the known individual package according to FIGS. 2 and 3, for accommodating an insert.

For completeness sake it is remarked here, that a text-insert is defined as any insert capable of carrying text or images or both.

In this respect, a further embodiment of the invention is preferred which has the characterizing feature that the covers are transparent and identical and, on the side of the swivelling axes, have a transversely running extension of sufficient depth for accommodating a text-bearing insert having a corresponding spine side and that the swivelling axis of each cover is arranged eccentrically in relation to the intermediate part assigned to the relevant cover. It is of great importance for the appearance of the package and for user-friendliness that it should be possible to read the titles of the packaged discs from the spine side of the package. In the case of individual packages according to FIGS. 2 and 3, the insert 33 has a spine 41 on both sides, which is visible from outside through the transparent base 23. Since the covers 9 of the multiple package according to FIG. 1 are of the same design as the base 23 with the carrying element 25 and the insert 33 of the individual package according to FIG. 3, the multiple package according to FIG. 1 is also provided on both sides with spine lettering. In the case of a package according to the embodiment of the invention just described, the cover has a vertical dimension on the side of the swivelling axis such that a spine of the insert can be accommodated therein, so that the package can again be provided with spine lettering on both sides.

In the package according to the invention, it is possible to use thin and therefore somewhat fragile covers, more specifically by using an important embodiment of the invention which has the characterizing feature that in the closed position each cover is covered laterally by side parts of the intermediate part swivellably connected to it. Apart from protection of the covers, this embodiment also leads to an aesthetically interesting and clean appearance of the package.

Another interesting embodiment can be combined readily with the previous embodiment and is characterized in that the covers have side walls having a thinner part approximately in the middle so that contact between the disc and the cover is avoided. The side walls improve the rigidity and the stiffness of the covers. The middle part of each side wall has such a dimension that damage to the disc when closing the cover is avoided. The remaining parts may have a larger dimension and thus a larger stiffness without increasing the overall thickness dimension of the package.

A further embodiment of interest for reducing the number of component parts to be used in the package has the characterizing feature that each disc carrier present is provided on both sides with clamping elements in the form of pegs which are regularly distributed and arranged with intermediate spaces in a circle, and that a peg is situated on one side where an intermediate space is provided on the other side. In this embodiment, even if clamping elements are to be present on both sides, the disc carrier can comprise a single component part produced by injection moulding. This is in contrast to the known multiple package according to FIG. 1, in which the clamping arrangements 17 are formed by individual parts which are assembled to only one or to both sides of the disc carrier 11 as required, for example by bonding or ultrasonic welding.

For packaging a plurality of discs, the package according to the invention can if required be designed in accordance with an embodiment which has the characterizing feature that the package comprises a plurality of identical disc carriers and that, in each case between two disc carriers present, there is an intermediate part, the shape of which is at least approximately that of two covers joined together back to back diametrically, and that, on each of the two sides, the intermediate part acts as cover for the adjacent disc carrier. Basically, the invention makes it possible for any desired number of discs to be accommodated in this way in a single multiple package, the package nevertheless comprising only standardized component parts connected swivellably to one another. It should however be apparent that a zigzag package of this kind also has its limits since, if the number of intermediate parts is too large, the package becomes awkward to handle and unstable. However, this embodiment of the invention is eminently suitable for accommodating from four to six and probably even more discs.

As will be explained later on, packages for more than two discs designed according to the invention may have the unique feature that each disc is accompanied by its own insert and that the spine text of each insert is visible from the outside of the package in the closed condition.

Another, surprisingly interesting embodiment of the invention has the characterizing feature that the package comprises just one disc carrier with clamping means on only one side and that the other side of the disc carrier can be used to accommodate an unusually thick text-insert having several pages. This embodiment can be significant in those cases in which a manufacturer considers it important to add comprehensive documentation to a single disc, e.g. a CD-ROM disc. A CD-ROM disc is an optical disc conforming to the CD standard on which data or programs are stored. The known individual package according to FIGS. 2 and 3 is unsuitable for an application of this kind. The known multiple package according to FIG. 1 is of little interest for such an application because the number of component parts used is too high and the depth of the package is too great, and because the two covers 9 are each provided with carrying elements 39. In the multiple package according to FIG. 1, one of the two carrying elements 39 cannot be omitted easily because the carrying element is necessary for holding an insert in place. Furthermore, the omission of a carrying element 39 would lead to the package not being completely closed on the outside in the closed position. On the side of the swivelling axis concerned, the package would have a slot-shaped opening, which is very unfavourable. In the closed position of a cover 9, the ribbed part 43 of the carrying element 39 lies over a strip 45 of the disc carrier 11, a seal thereby being produced in the presence of a carrying element 39.

Of great importance is a preferred embodiment of the invention which has the characterizing feature that the package comprises just one single disc carrier and has principal dimensions of essentially $142.2 \times 124.6 \times 10.4$ mm, the package thereby having the same principal dimensions as the individual CD package customarily used in the trade and being usable in the same way in the sales stands customarily used in the trade for displaying CDs. This embodiment of the invention has the same principal dimensions as the known individual package according to FIGS. 2 and 3 and is readily interchangeable with the known individual package in the sales stands customary in the trade. It is thus possible to use the new package according to the invention in the standardized sales stands present in large numbers in the trade, with only one or with two discs, it being possible in the first case to add an extra thick text insert without the necessity of special measures in the sales stands or the requirement for more space than for the known individual packages. All of this is achieved while retaining an interesting appearance of the package, a low number of component parts and a correspondingly low price.

Of interest when using a package according to the invention for packaging just one disc is a further embodiment which has the characterizing feature that the text-bearing insert has principal dimensions of essentially 138×139×3.3 mm. By employing this last embodiment, the available space for accommodating a text-bearing insert in the package according to the invention is optimally used in the case of a CD.

BRIEF DESCRIPTION OF THE DRAWINGS

Illustrative embodiments of the invention are represented in the drawing and are described in greater detail below. In the drawings.

The respective figures are drawn on an arbitrary scale, which is not always the same.

DETAILED DESCRIPTION OF THE PREFERRED EMBODIMENTS

Figure 4:
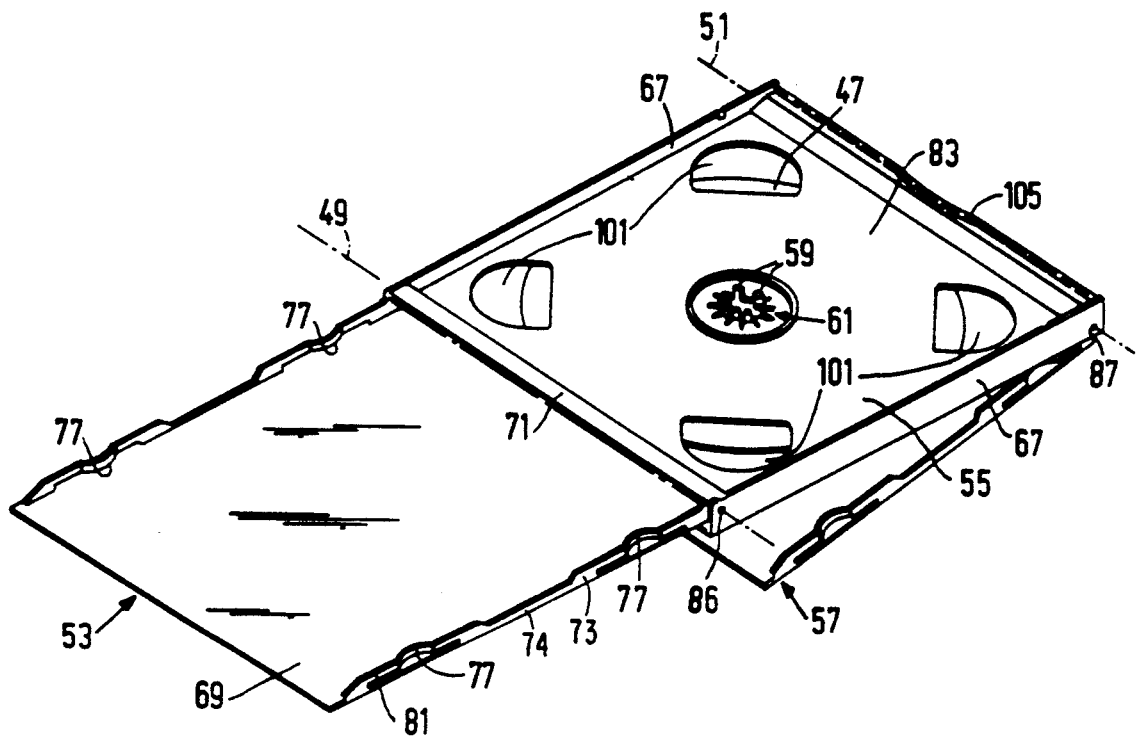
FIG. 4 shows a diagrammatic view of a package according to the invention, just one disc being accommodated in the package for the sake of clarity and the package furthermore containing no text insert.
Figure 5:
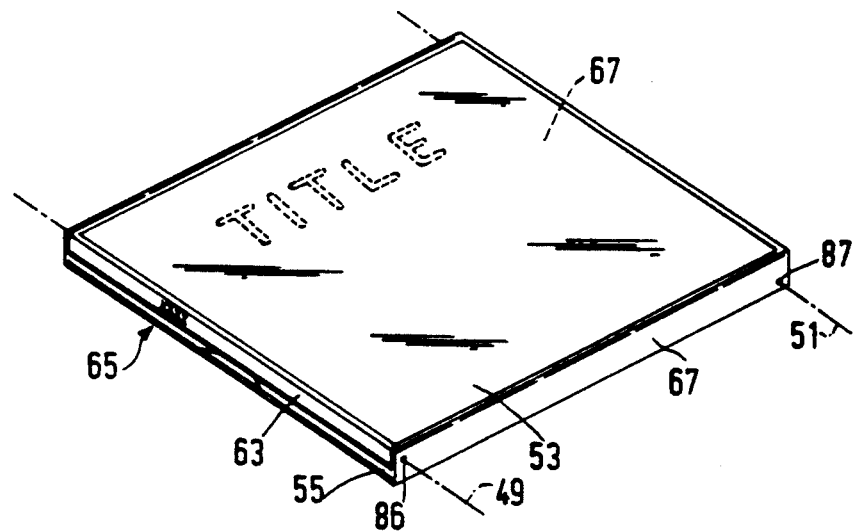
FIG. 5 shows a diagrammatic view of the package according to FIG. 4, in the closed position and with text inserts inserted.
Figure 6:
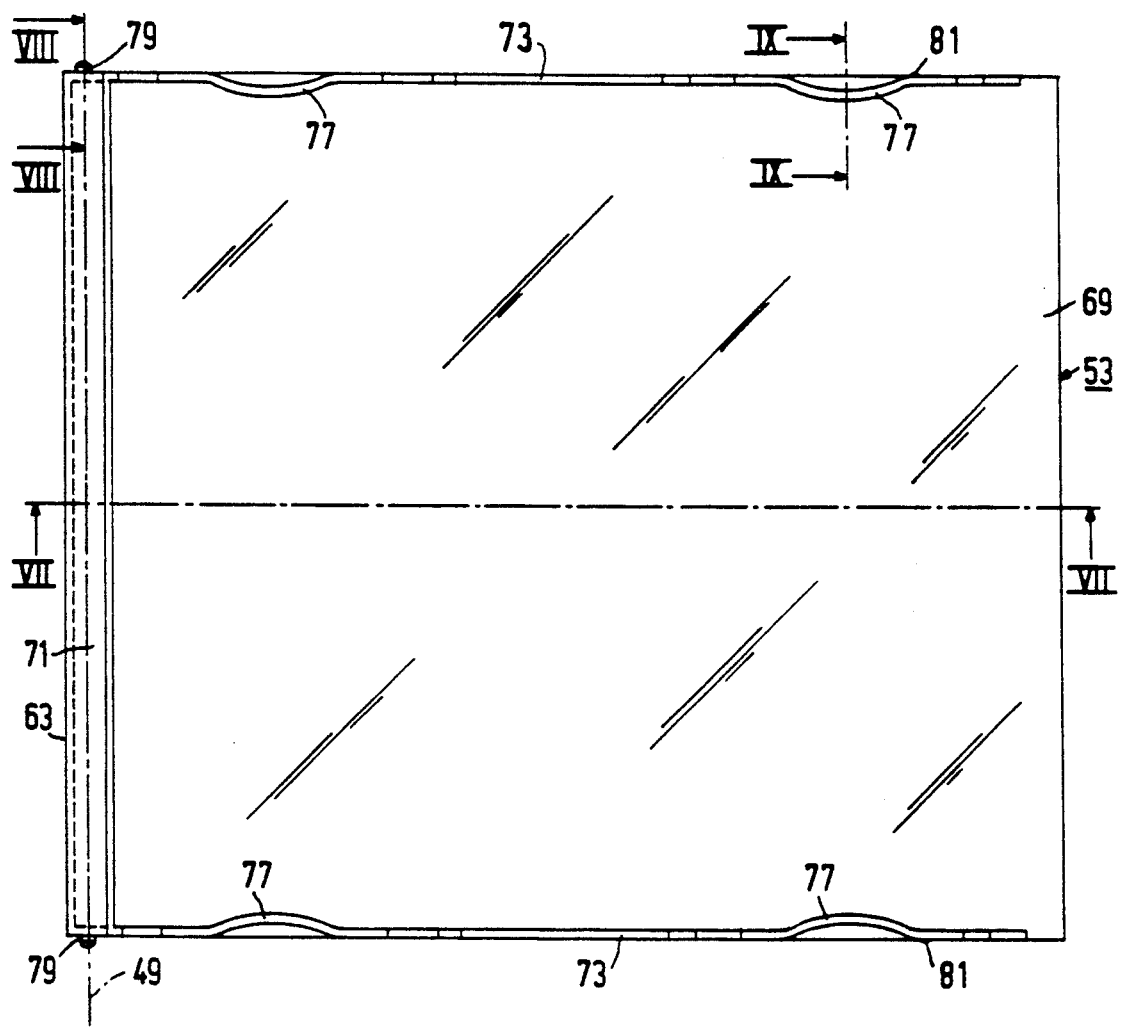
FIG. 6 shows a view of the inner side of a cover for the package according to FIGS. 4 and 5.
Figure 7:
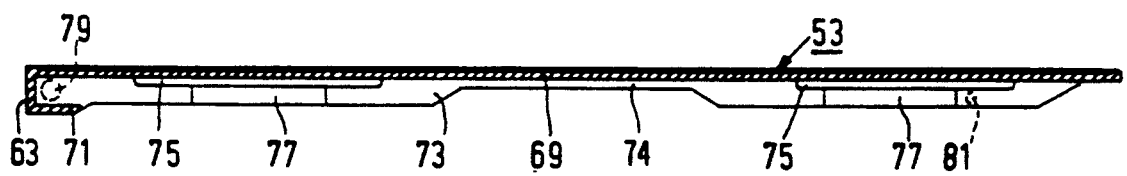
FIG. 7 shows a section through the cover according to FIG. 6 in accordance with the arrows VII—VII.
Figure 8:
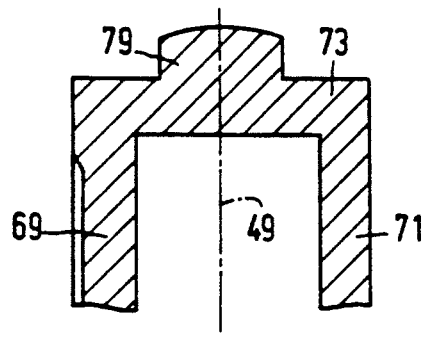
FIG. 8 shows a section through a detail of the cover according to FIG. 6 in accordance with the arrows VIII—VIII.
Figure 9:
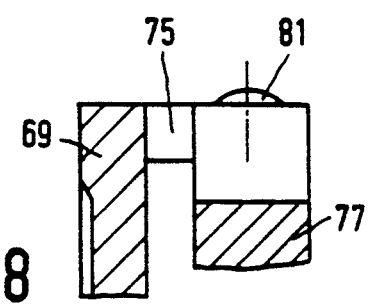
FIG. 9 shows a section through a detail of the cover according to FIG. 6 in accordance with the arrows IX—IX.

The package according to FIGS. 4 to 14 is suitable for a maximum of two discs 47 provided with a central center hole and comprises three rectangular component parts 53 to 57 inclusive, connected to one another so as to be swivellable about parallel swivelling axes 49 and 51. These parts are two mutually opposite covers 53 and 57 arranged on the outside and an intermediate part 55 arranged between them, which is designed as a disc carrier. To hold a disc 47 clamped, the disc carrier has clamping elements 59 assigned to a clamping arrangement 61. According to the invention, the swivelling axes 49 and 51 of the disc carrier 55 provided between the two covers 53 and 57 are situated alternately opposite one another, the package thus having a zigzag shape in the opened position in FIG. 4. The two covers 53 and 57 do not have any clamping elements, thus only the disc carrier 55 has clamping elements. The covers are identical and are produced from a transparent plastic. On the side of the swivelling axis 49, the cover 53 is provided with a transversely extending extension 63 of sufficient depth to accommodate an insert bearing a title 65 on the spine, this title being indicated symbolically by XXXX in FIG. 5. The insert itself is not illustrated in FIG. 4 but is described below. In FIG. 5, the insert is denoted by 67. It is visible through the transparent upper side of the cover 53 and through the transversely extending extension 63. As already mentioned, cover 57 corresponds to cover 53 and consequently likewise has a transversely extending extension (not visible in the drawing) for an insert having a title on the spine. The swivelling axes 49 and 51 of each of the two covers are located eccentrically relative to the disc carrier 55, i.e. in relation to a center plane of the disc carrier, swivelling axis 49 is situated further towards the side of cover 53 and swivelling axis 51 is situated further towards the side of cover 57. Together with the presence of the transversely extending extension, this feature makes possible a completely closed external shape of the package, the inserts always being visible from the outside, looking at the covers and the spine sides of the package, through each of the transparent covers.

In the closed position, cf. FIG. 5, each of the covers 53 and 57 is covered at the side by side parts 67 of the disc carrier 55 swivellably connected to the cover. In this way, the somewhat vulnerable covers are completely protected from damage in the closed position. Due to the use of this measure the side of the package additionally has a firm and aesthetically pleasing shape.

Some details of the cover 53 are described in greater detail with reference to FIGS. 6 to 9.

The cover comprises an essentially flat main part 69, adjoining which on the spine side is the transversely extending extension 63. Transversely to this part—and hence parallel to the main part 69—there is a strip 71. As a result, the cover is U-shaped in cross-section on the spine side. A desired reinforcement of the cover at the location of the swivelling axis 49 is thereby obtained and a possible means of enclosing a spine part of an insert, to be described, is simultaneously provided. Side walls 73 extend transversely to the main part 69 over almost the entire length. For enclosing an insert, these side walls are provided in a manner known per se with curved strips 77 separated from the main part 69 by slots 75. The height of the slots 75 is such that an insert can be pushed under the curved strips 77 with a certain play.

On the spine side, a swivel peg 79 is provided on both sides of the cover for the purpose of securing the cover swivellably in the disc carrier 55. A snap-in knob 81 is provided in the vicinity of the front side of the cover on each of the side walls 73, for the purpose of snapping in the cover. Approximately in the center, the side walls have a thinner part 74 so that contact between the disc and the package is avoided.

Some details of the disc carrier 55 are described in greater detail with reference to FIGS. 10 to 14 inclusive. The disc carrier comprises an essentially flat main part 83, having side walls 67 extending transversely thereto. The clamping elements 59 assigned to the central clamping arrangement 61 are situated in the center of the main part 83. As illustrated, in particular, in FIG. 12, the disc carrier is provided on both sides with peg-shaped clamping elements provided in a circle and distributed regularly with intermediate spaces 85, a peg 59 on one side being situated at a point at which an intermediate space 85 is provided on the other side. As a result, the disc carrier 55 can be produced from plastic in a single operation as an injection-moulded part but is nevertheless suitable for holding a disc on both sides.

For the purpose of satisfactory mounting of the swivel pegs 79 of the cover 53 in the disc carrier, the latter is provided at one of its ends with through bearing openings 87. Wedge-shaped slots 89 and 91 are provided to enable the covers to be mounted by means of a snap-in connection on the disc carrier. Wedge-shaped slots 93 and 95 and snap-in spaces 97 and 99 are provided for the purpose of a snap closure of the cover by means of the snap-in knobs 81.

Figures 10, 11:
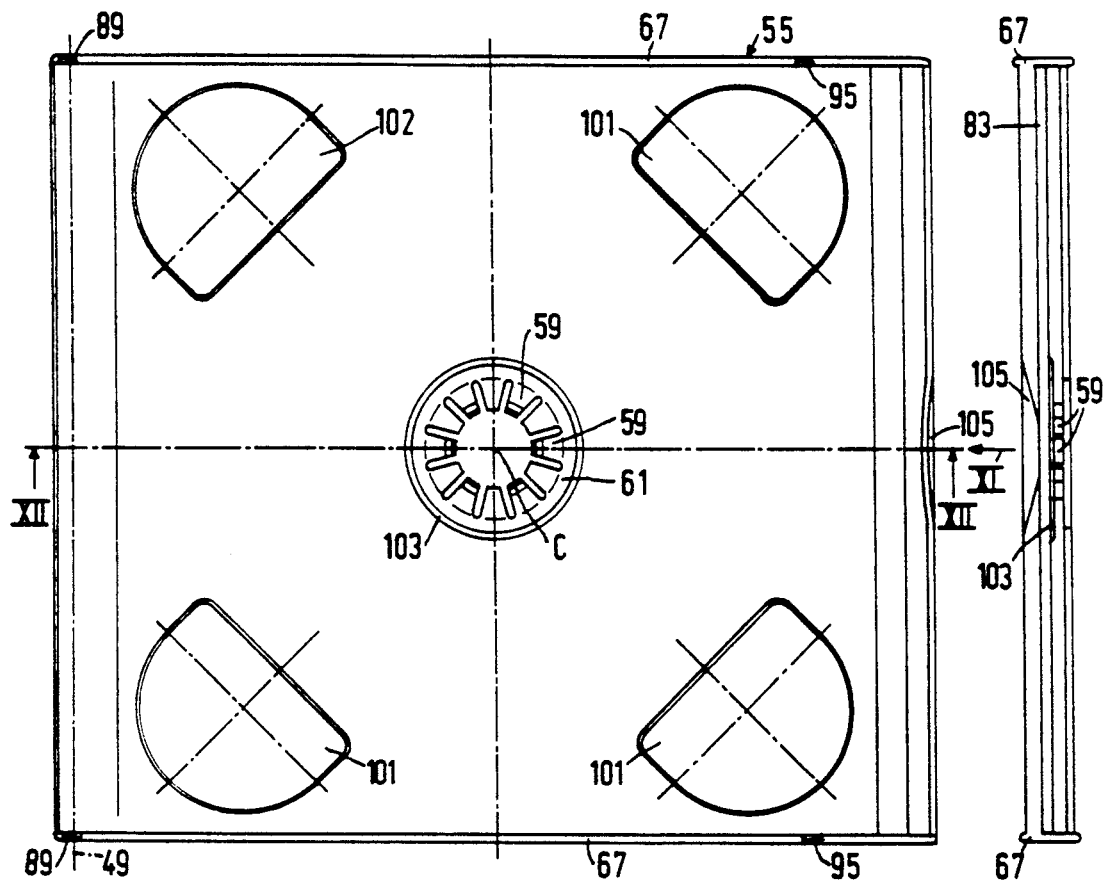
FIG. 10 shows a plan view of the disc carrier for the package according to FIGS. 4 and 5.
FIG. 11 shows an elevation of the disc carrier according to FIG. 10 in accordance with the arrow XI.
Figure 12:
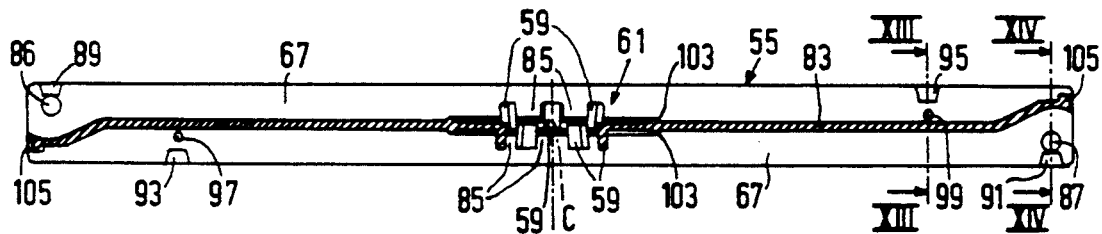
FIG. 12 shows a section in accordance with the arrows XII—XII of the disc carrier according to FIG. 10.
Figure 13:
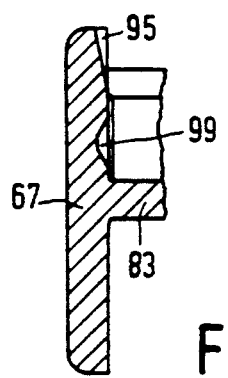
FIG. 13 shows a section in accordance with the arrows XIII—XIII in FIG. 12.
Figure 14:
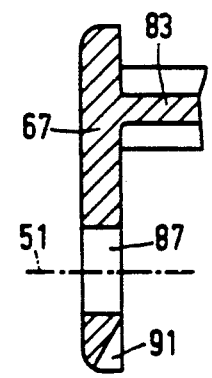
FIG. 14 shows a section through a detail in accordance with the arrows XIV—XIV in FIG. 12.

As FIG. 12 clearly shows, the bearing openings 86 and 87 are eccentrically positioned. The shape of the disc carrier 55 can be considered overall to be diametrically symmetrical with respect to the center C of the main part 83 (FIGS. 11-12). To facilitate the removal of a disc from the package, the main part 83 is provided with four gripping hollows 101. As FIG. 4 shows, these can be through openings. If desired, however, these openings can be provided completely or partially with a bottom, e.g. two on each side, to avoid a situation in which a disc on the other side of the disc carrier can be touched through a gripping hollow. A further detail to be mentioned for the sake of completeness is that the clamping arrangement 61 has annular projections 103 on each side of the main part 83 of the disc carrier, more specifically for supporting a positioned disc in an area around the center hole and outside the information-bearing area of the disc. Recesses 105 are provided on the front side of the covers for opening the cover concerned with the aid of a fingernail or a fingertip.

Figure 15:
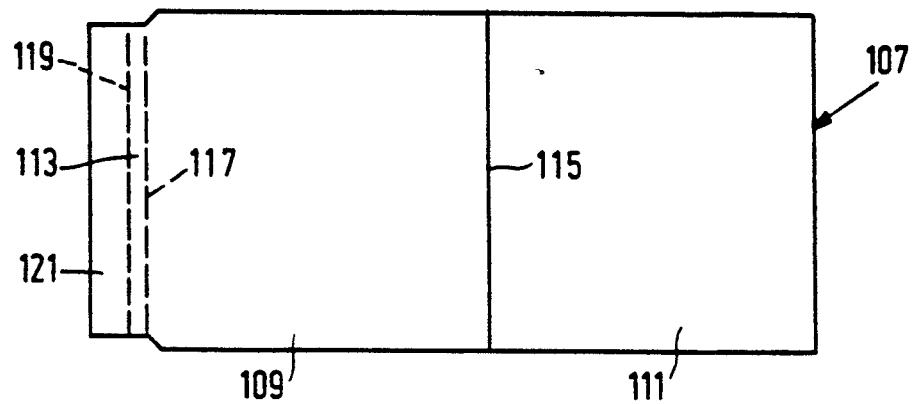
FIG. 15 shows a developed view for an insert.
Figure 16:
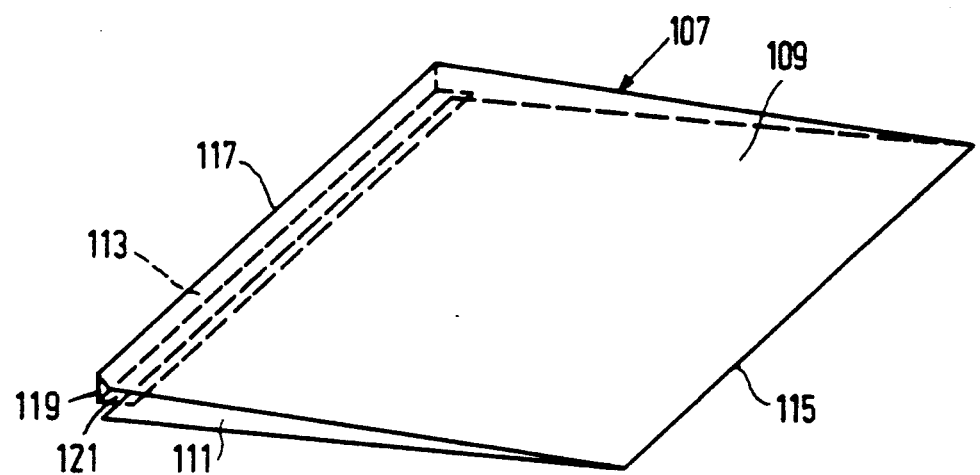
FIG. 16 shows a diagrammatic view of the insert of FIG. 15 after folding.

FIGS. 15 to 18 show possible embodiments of inserts with text or images for a package such as that illustrated in FIGS. 4 and 5. FIGS. 15 and 16 relate to an insert 107 having two sheets 109 and 111, which can be printed on both sides, and a spine part 113 for a spine text. Between the sheets 109 and 111 there is a folding groove 115. Folding groove 117 is situated between the spine part 113 and sheet 109 and there is a further folding groove between the spine part 113 and a further part 121. The spine part 113 and the further part 121 are not as wide as the sheets 109 and 111, more specifically such that, in the folded condition, cf. FIG. 16, the spine part and the further part do not impair the fitting of the insert under the curved strips 77. The spine part 113 serves for the fitting of the spine text 65, the further part 121 rests against the strip 61 of the cover 53 and can likewise be provided with an imprint.

Figure 17:
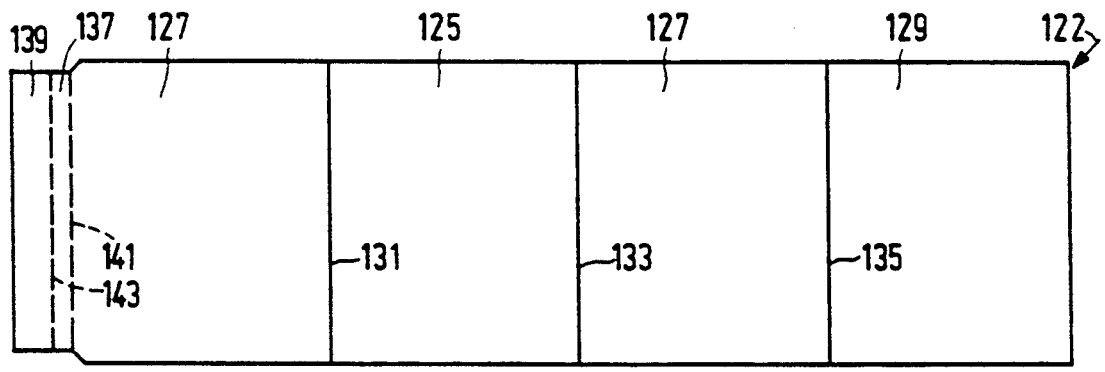
FIG. 17 corresponds to FIG. 15 but here shows an insert having several pages.
Figure 18:
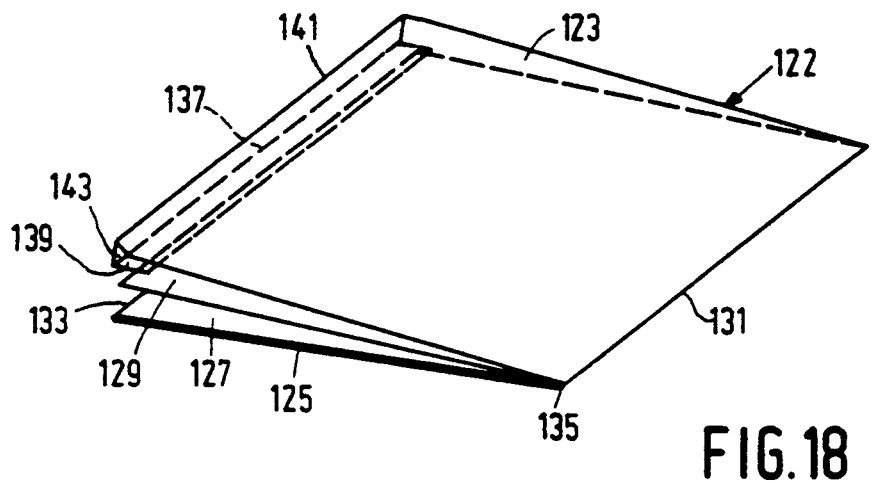
FIG. 18 shows a diagrammatic view of the insert according to FIG. 17 after folding.

Instead of four printable sides, the insert can, as an alternative, comprise, for example, eight printable sides, cf. FIGS. 17 and 18. In this embodiment there are four sheets 123 to 129, between which folding grooves 131 to 135 are provided. As in the case of the embodiment according to FIGS. 15 and 16, a narrower spine part 137 and a further part 139 with associated folding grooves 141 and 143 are provided.

Figure 19:
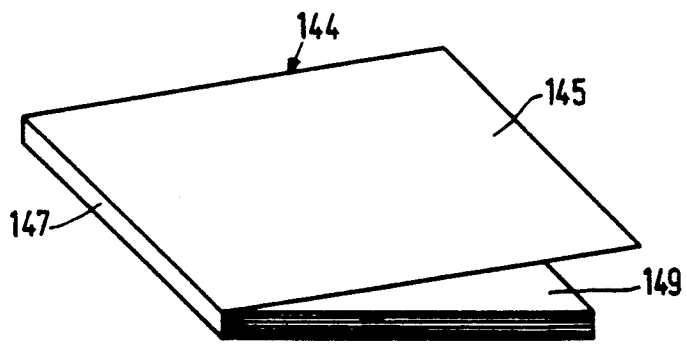
FIG. 19 shows a diagrammatic view of a text insert in booklet form for use in an illustrated package for just one disc.

If the package illustrated in FIGS. 4 and 5 were modified for just one disc, for which purpose the disc carrier 55 would have to have clamping elements 59 on only one side, then it would be advantageous to use a text insert 144 as illustrated in FIG. 19, which could have a title page 145, a spine 147 and a number of pages 149 of text or images. For the purpose of fitting a text insert 144 in the cover 53, the width of the insert could be chosen such that the insert as a whole would fit between the curved strips 77. As regards the thickness, this can be such that the insert fits between the main part 69 of the cover 53 and the strip 71. The space between the cover and the disc carrier is thereby almost completely filled by the text insert. It is also possible to design the title page 145 in such a way that it fits under the curved strips 77. As a result, the insert is opened at the moment the cover 53 is opened. The insert 144 can have an unusual thickness for use in a disc package if no disc is arranged on the relevant side of the disc carrier. By virtue of this, the package according to the invention offers a significant advantage over the known single package according to FIGS. 2 and 3, where this is of course not possible.

Figure 2:
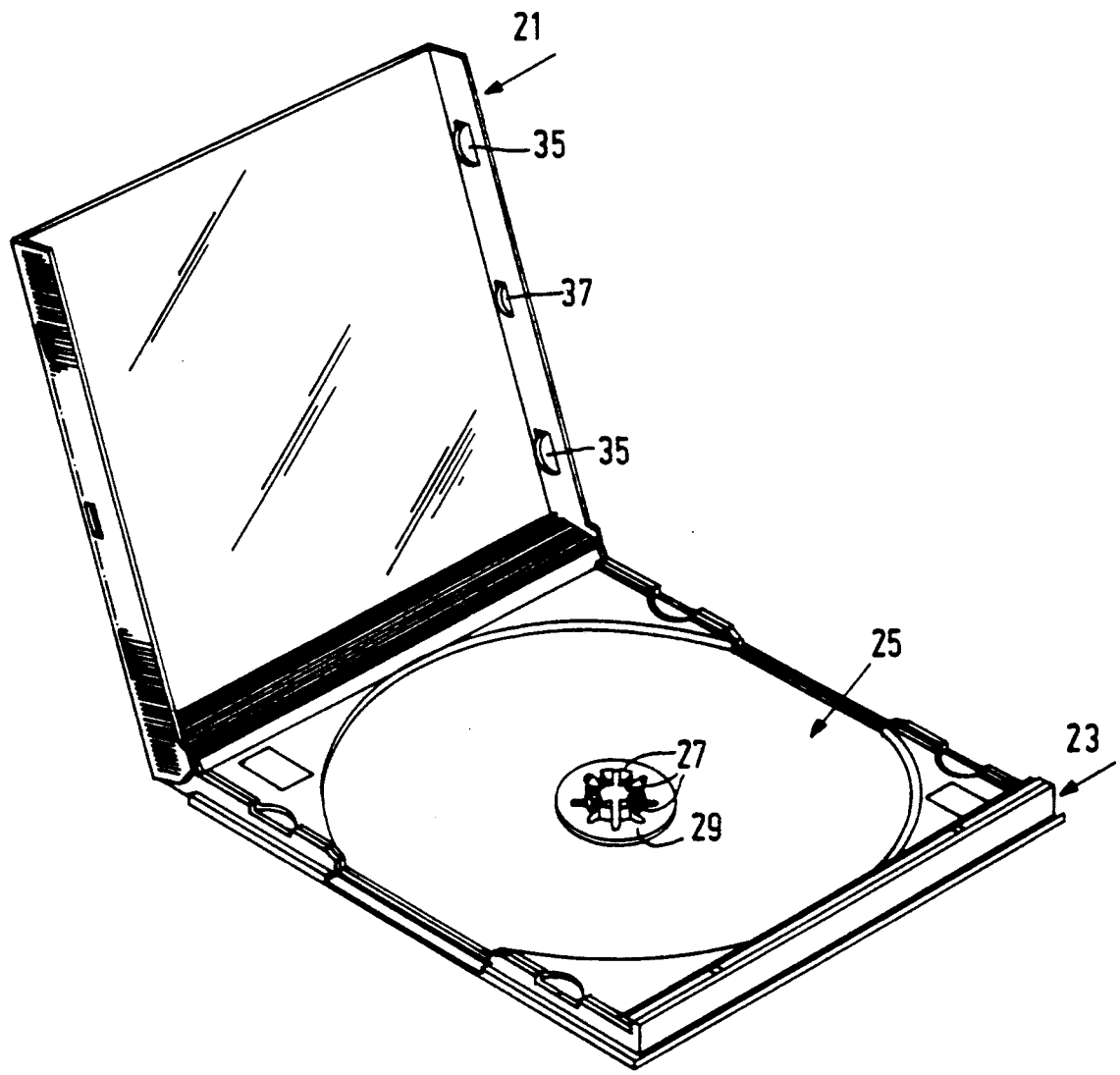
Figure 3:
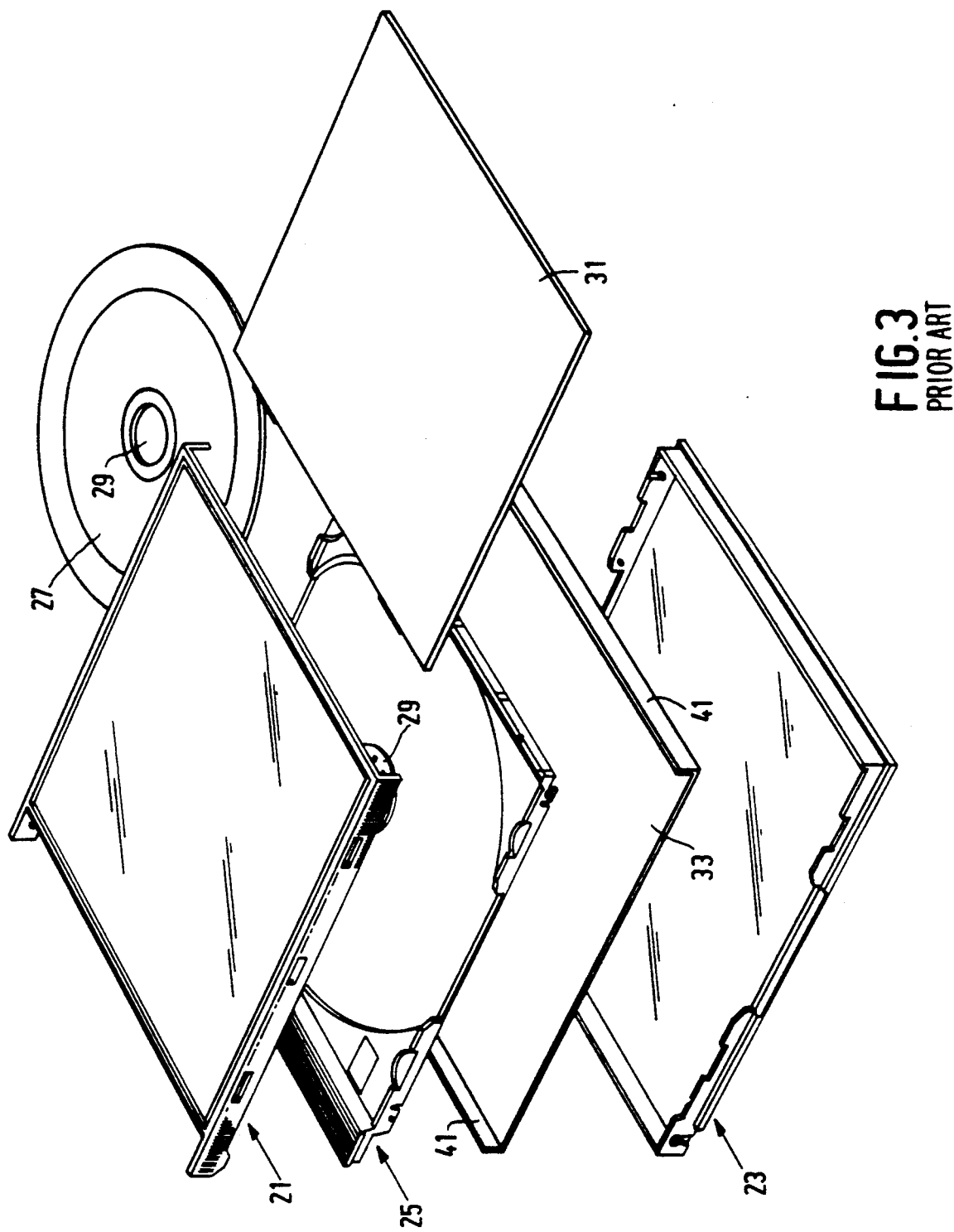

It has been found that the package as illustrated in FIGS. 4 and 5, i.e. with only one disc carrier 55, can be made with principal dimensions of essentially 142.2×124.6×10.4 mm. This means that the principal dimensions correspond exactly to those of the known individual CD package as illustrated in FIGS. 2 and 3. For the purpose of display in the sales stands customary in the trade, the new package according to this embodiment is consequently readily interchangeable. The text insert 144 can have dimensions of essentially 138×130×3.3 mm, the space in the individual package according to the invention with principal dimensions which correspond to those of the known individual CD package thus being optimally used.

Figure 20:
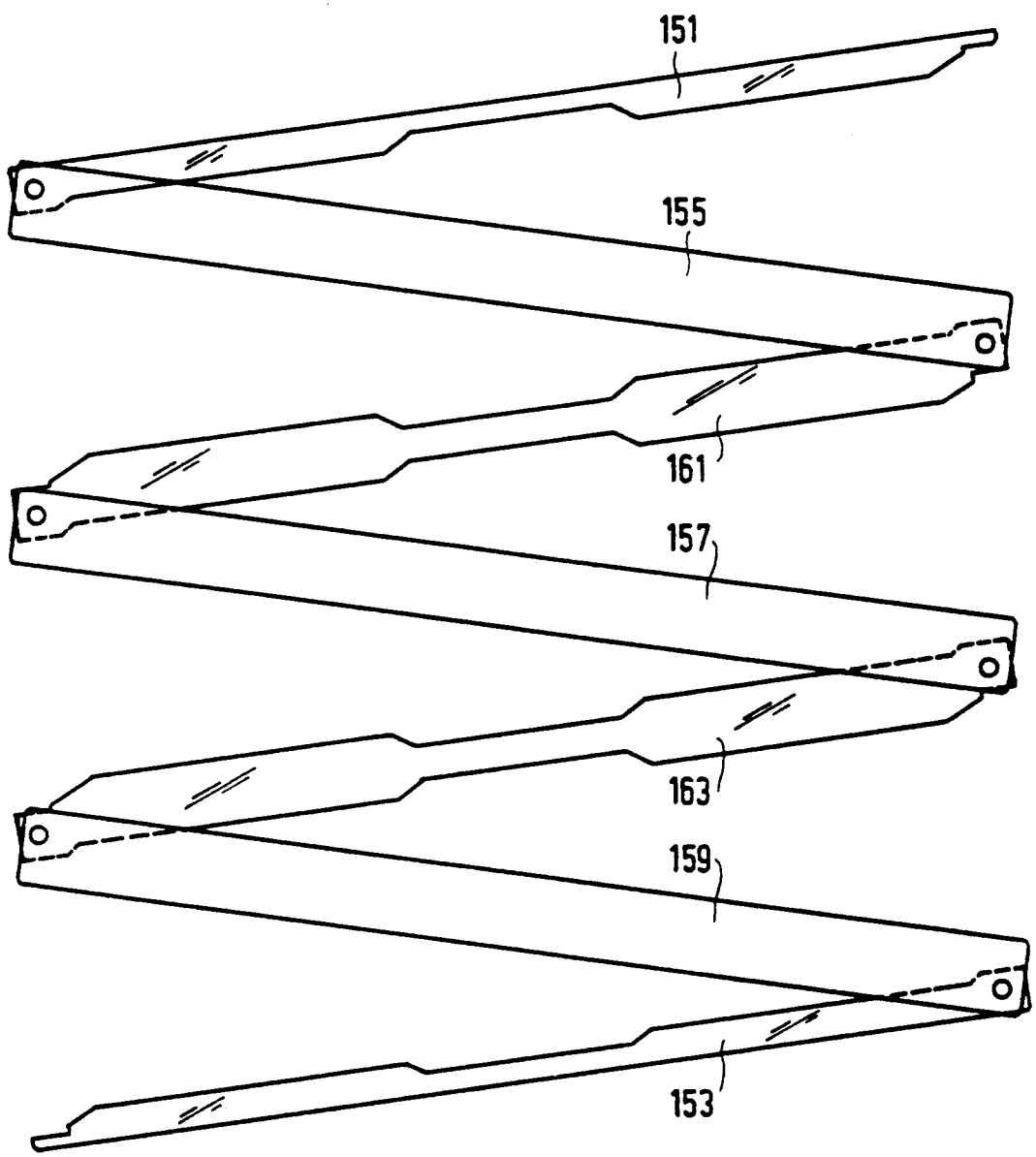
FIG. 20 shows a side view of a multiple package for a maximum of six discs.

The package according to FIG. 20 can be regarded as an extension of the package illustrated in FIGS. 4 and 5. Here, there are identical covers 151 and 153 which can be identical to the covers 53 and 57 of the package already described. There are a plurality of intermediate parts, including three identical disc carriers 155-159, which can correspond completely to the disc carrier 55 of the individual package described. There are further intermediate parts 161 or 163 between the disc carriers. The shape of these further intermediate parts is at least approximately that of two covers joined together back to back. Like the other parts they are produced as a single part from plastics. Each of the intermediate parts 161 and 163 acts On each of its sides as a cover for an adjacent disc carrier. Intermediate part 161 thus acts as a cover for disc carriers 155 and 157 and intermediate part 163 acts as a cover for disc carriers 157 and 159. In this way a package has been obtained which is suitable for packaging up to six discs. Since the intermediate parts 161 and 163 are designed as covers joined together back to back, inserts can be fitted on both sides to each of these intermediate parts. In this way, it is possible to employ a total of up to six inserts, for example an individual insert for each disc. The spine text of each individual insert is visible from the outside of the package and this may be described as unique feature of the package of the invention.

As illustrated in FIG. 4, a package according to the invention can be constructed from just three plastic parts, which are assigned to just two different categories, namely from two covers, which are assigned to a first category of component parts, and a single disc carrier which is assigned to a second category of component parts. The package according to FIG. 20 can be constructed from component parts assigned to three different categories, namely from two outer covers, which are assigned to a first category of component parts, disc carriers, which are assigned to a second category of component parts, and intermediate parts which are assigned to a third category. It is thus possible to put together packages for any number of discs using only three different types of component parts. At the same time, it is possible to use inserts of just one single type.

Many different packages are possible within the framework of the invention, all of them comprising covers arranged on the outside and intermediate parts arranged between said covers, these covers and intermediate parts being connected to one another alternately in articulated fashion to form a single package. Thus, for example, in the case of the package according to FIGS. 4 and 5, at least one of the covers could simultaneously be used as disc carrier if the cover is provided centrally with a clamping arrangement corresponding to the clamping arrangement 61 of the disc carrier 55. If both covers are to act as disc carriers, the package of FIGS. 4 and 5 could be used to package up to four discs. In this case, however, it is not easily possible to offer a package whose thickness is no greater than that of the known individual CD package according to FIGS. 2 and 3.

Figure 21:
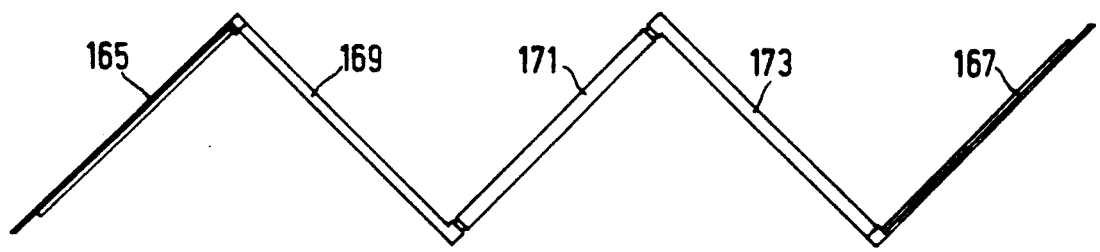
FIG. 21 shows a side view of another multiple package.
Figure 22:
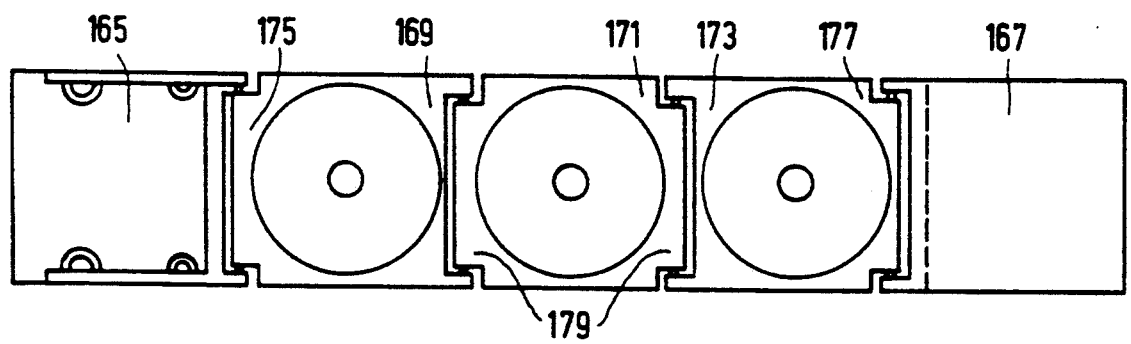
FIG. 22 shows an elevation of the package according to FIG. 21 in the form of a developed view.

Another possible embodiment of a multiple package is described in greater detail with reference to the schematic example illustrated in FIGS. 21 and 22. In the case of this package, two covers 165 and 167 with three intermediate parts 169–173 acting as disc carriers provided between them are present. The respective parts of the package are connected together swivellably like the links of a chain, cf. FIG. 22. The covers 165 and 167 can be identical. The disc carriers 169 and 173 can also correspond to one another completely. On one side only in each case, they have a reduction 175 and 177 respectively, which fits into the cover at the position of a swivelling axis. The central disc carrier 171 has reductions 179 on both sides for the purpose of connection to disc carriers 169 and 173 in the vicinity of the articulation axes concerned. Basically, like the package according to FIG. 20, this package too can be extended ad infinitum.

Figure 1:
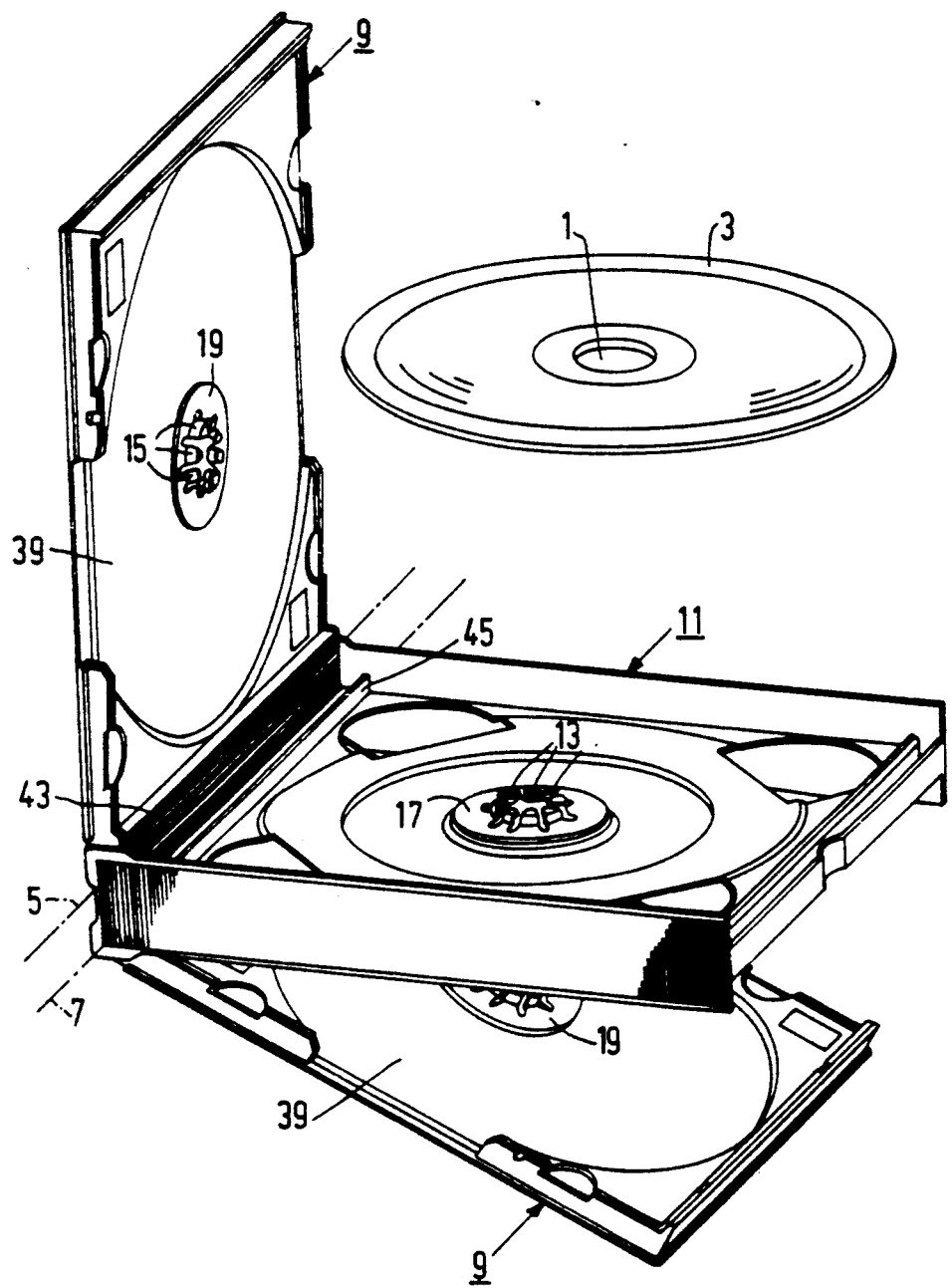

The invention has been described in comparison with the known CD packages illustrated in FIGS. 1, 2 and 3. However, the possibility that the package according to the invention has other, as yet unmentioned advantages in comparison with other known packages is not excluded, this depending on the construction of these other packages. Compared to all other disc packages known hitherto, the invention offers the advantage that it can be rendered suitable for any desired number of discs, that it can be constructed from a small number of standardized component parts, has small outside dimensions, is inexpensive and, if crystal-clear plastic is used for the covers in combination with inserts bearing tasteful printed images and/or text, can have an aesthetically pleasing appearance. Furthermore, it is not possible in any of the packages known hitherto for packaging more than two discs to use for each disc an individual insert, the spine text of which can be read from the outside with the package closed.

We claim:

1. A package for a plurality of discs, each disc having a central hole, said package comprising a plurality of rectangular component parts swivelably connected to one another about parallel swiveling axes, said plurality of component parts consisting of at least one intermediate disc carrier having a clamping element for securing a disc via its central hole, and two covers each having a major surface respectively arranged on opposite sides of the intermediate disc carrier, in a closed condition of the package said covers and intermediate disc carrier being substantially parallel each other, characterized in that said intermediate disc carrier is swivelably connected to one of said covers at one end of the carrier, and is swivelably connected to an adjoining one of the other, of said plurality of component parts at the other end of the carrier, the package thus opening into a zigzag shape, and said intermediate disc carrier comprises two side walls each extending between said ends, in said closed condition each side wall laterally covering a corresponding side edge of the cover, whereby said cover is protected from damage.

2. A package as claimed in claim 1, characterized in that the swivelling axes at opposite ends of said intermediate disc carrier are arranged on opposite outer sides of said intermediate disc carrier.

3. A package as claimed in claim 2, characterized in that said intermediate disc carrier comprises two clamping elements, one on each side of the carrier, said clamping element being formed by coaxial circular arrangements of regularly distributed pegs having intermediate spaces therebetween, each peg on one side of the carrier being opposite an intermediate space on the other side.

4. A package as claimed in claim 3, characterized in that said intermediate disc carrier is a unitary injection-molded part.

5. A package as claimed in claim 4, characterized in that said covers have side walls having a thinner portion approximately in the center between said ends, for avoiding contact between the cover and a disc stored on a side of the intermediate carrier adjacent either cover.

6. A package as claimed in claim 5, characterized in that said covers are formed of a transparent material, each cover comprising a transverse extension at the end adjacent the swivelling connection of the respective cover, said extension having a sufficient depth perpendicular to said major surface to accommodate a text-bearing insert having a corresponding spine side, whereby any text on the insert spine can be read from the outside of the package.

7. A package as claimed in claim 1, characterized in that each said side wall completely covers said corresponding side edge of the cover, whereby said cover is completely protected from damage.

8. A package for a plurality of discs, each disc having a central hole, said package comprising a pluraliyt of rectangular component parts swivelling axes, said pluraliyt of component parts including an intermediate disc carrier having a clamping element for securing a disc via its central hole, and two covers each having a major surface respectively arranged on opposite outer sides of the intermediate disc carrier, in a closed condition of the package said covers and intermediate disc carrier being substantially parallel each other, characterized in that said intermediate disc carrier is swivellably connected to one of said covers at one end of the carrier, and is swivellably connected to another adjoining component part at the other end of the carrier, the package thus opening into a zigzag shape, said intermediate disc carrier comprises two side walls each extending between said ends, in said closed condition each side wall laterally covering a corresponding side edge of the cover, whereby said cover is protected from damage, and said intermediate disc carrier comprises two clamping elements, one of each side of the carrier, said clamping elements being formed by coaxial circular arrangements of regularly distributed pegs having intermediate spaces therebetween, each peg on one side of the carrier being opposite an intermediate space on the other side.

9. A package as claimed in claim 8, characterized in that said intermediate disc carrier is a unitary injection-molded part.

10. A package as claimed in claim 9, characterized in that the swivelling axes at opposite ends of said intermediate disc carrier are arranged on opposite outer sides of said intermediate disc carrier.

11. A package as claimed in claim 10, characterized in that said covers are formed of a transparent material, each cover comprising a transverse extension at the end adjacent the swivelling connection of the respective cover, said extension having a sufficient depth perpendicular to said major surface to accommodate a text-bearing insert having a corresponding spine side, whereby any text on the insert spine can be read from the outside of the package.

12. A package as claimed in claim 8, characterized in that said covers are formed of a transparent material, each cover comprising a transverse extension at the end adjacent the swivelling connection of the respective cover, said extension having a sufficient depth perpendicular to said major surface to accommodate a text-bearing insert having a corresponding spine side, whereby any text on the insert spine can be read from the outside of the package.

13. A package as claimed in claim 12, characterized in that said intermediate disc carrier connected to said one cover is a first intermediate disc carrier, and the package comprises a further intermediate disc carrier and at least one intermediate part, said further intermediate carrier including a clamping element for securing a disc via its central hole, said intermediate part being shaped approximately the same as two said covers joined back-to-back, said intermediate part being swivellably connected at one end to said first intermediate disc carrier, and being swivellably connected at an opposite end to said further intermediate carrier, said intermediate part acting as a cover for discs stored on respective adjacent sides of the first and further intermediate disc carriers.

14. A package as claimed in claim 13, characterized in that in said closed condition each side wall completely covers a corresponding side edge of the cover connected thereto.

15. A package as claimed in claim 13, characterized in that a separate text insert is provided for each disc.

16. A package as claimed in claim 8, characterized in that said intermediate disc carrier connected to said one cover is a first intermediate disc carrier, and the package comprises a further intermediate disc carrier and at least one intermediate part, said further intermediate carrier including a clamping element for securing a disc via its central hole, said intermediate part being shaped approximately the same as two said covers joined back-to-back, said intermediate part being swivellably connected at one end to said first intermediate disc carrier, and being swivellably connected at an opposite end to said further intermediate carrier, said intermediate part acting as a cover for discs stored on respective adjacent sides of the first and further intermediate disc carriers.

17. A package as claimed in claim 16, characterized in that the swivelling axes at opposite ends of said intermediate disc carrier are arranged on opposite outer sides of said intermediate disc carrier.

18. A package for a disc having a central hole, said package comprising a plurality of rectangular component parts swivellably connected to one another about parallel swivelling axes, said plurality of component parts including an intermediate disc carrier having a clamping element for securing a disc via its central hole, and two covers each having a major surface respectively arranged on opposite outer sides of the intermediate disc carrier, in a closed condition of the package said covers and intermediate disc carrier being substantially parallel each other, characterized in that said intermediate disc carrier is swivellably connected to one of said covers at one end of the carrier, and is swivellably connected to another adjoining component part at the other end of the carrier, the package thus opening into a zigzag shape, said intermediate disc carrier comprises two side walls each extending between said ends, in said closed condition each side wall laterally covering a corresponding side edge of the cover, whereby said cover is protected from damage, and said covers are formed of a transparent material, each cover comprising a transverse extension at the end adjacent the swivelling connection of the respective cover, at least one said extension having a sufficient depth perpendicular to said major surface to accommodate a text-bearing insert having a corresponding spine side, whereby any text on the insert spine can be read from the outside of the package.

19. A package as claimed in claim 18, characterized in that a separate text insert is provided for each disc.

20. A package as claimed in claim 19, characterized in that the swivelling axes at opposite ends of said intermediate disc carrier are arranged on opposite outer sides of said intermediate disc carrier.

21. A package as claimed in claim 18, characterized in that said intermediate disc carrier has one clamping element only; said another adjoining component part is the other cover; and only one of said covers accommodates a thick text insert having a spine.

* * * * *